United States Patent
Li et al.

(10) Patent No.: US 10,135,093 B2
(45) Date of Patent: Nov. 20, 2018

(54) HIGH VOLTAGE SOLID ELECTROLYTE COMPOSITIONS

(71) Applicant: Wildcat Discovery Technologies, Inc., San Diego, CA (US)

(72) Inventors: Bin Li, San Diego, CA (US); Marissa Caldwell, Minneapolis, MN (US)

(73) Assignees: Wildcat Discovery Technologies, Inc., San Diego, CA (US); Medtronic, Inc., Minneapolis, MN (US)

( * ) Notice: Subject to any disclaimer, the term of this patent is extended or adjusted under 35 U.S.C. 154(b) by 0 days.

(21) Appl. No.: 15/085,936

(22) Filed: Mar. 30, 2016

(65) Prior Publication Data

US 2017/0288265 A1 Oct. 5, 2017

(51) Int. Cl.
| | | |
|---|---|---|
| *H01M 10/0565* | (2010.01) | |
| *H01M 10/0525* | (2010.01) | |
| *H01B 1/12* | (2006.01) | |
| *C08J 3/09* | (2006.01) | |
| *C08J 5/22* | (2006.01) | |

(52) U.S. Cl.
CPC ........ *H01M 10/0565* (2013.01); *C08J 3/09* (2013.01); *C08J 5/2256* (2013.01); *H01B 1/12* (2013.01); *H01M 10/0525* (2013.01); *C08J 2371/02* (2013.01); *H01M 2300/0082* (2013.01)

(58) Field of Classification Search
CPC ........ H01M 10/0565; H01M 10/0525; H01M 4/131; H01B 1/12; C08J 3/09; C08J 5/22
See application file for complete search history.

(56) References Cited

U.S. PATENT DOCUMENTS

| | | | | |
|---|---|---|---|---|
| 5,965,299 A | * | 10/1999 | Khan | .......... C08F 292/00 429/302 |
| 7,189,477 B2 | | 3/2007 | Mikhaylik | |
| 8,048,562 B2 | | 11/2011 | Pozin et al. | |
| 8,865,353 B2 | | 10/2014 | Abe et al. | |
| 2001/0018150 A1 | * | 8/2001 | Morita | .......... C01B 31/02 429/231.8 |
| 2003/0026063 A1 | | 2/2003 | Munshi | |
| 2004/0197665 A1 | * | 10/2004 | Amine | .......... H01M 6/18 429/313 |
| 2004/0214090 A1 | * | 10/2004 | West | .......... H01M 4/0426 429/311 |
| 2005/0234177 A1 | * | 10/2005 | Zaghib | .......... C08F 283/00 524/435 |

(Continued)

FOREIGN PATENT DOCUMENTS

| | | |
|---|---|---|
| EP | 1030399 B1 | 5/2009 |
| EP | 2355213 B1 | 10/2014 |
| WO | 2014080039 A1 | 5/2014 |

OTHER PUBLICATIONS

Xu, Kang "Nonaqueous Liquid Electrolytes for Lithium-Based Rechargeable Batteries", Chemical Review 2004, 104, 4303-4417.

(Continued)

*Primary Examiner* — Kenneth J Douyette
(74) *Attorney, Agent, or Firm* — Corridor Law Group, P.C.

(57) ABSTRACT

An electrochemical cell having an anode, a solid electrolyte, and a cathode. The solid electrolyte includes a polymer gel formed from an ethylene oxide polymer combined with a liquid precursor. The liquid precursor contains at least 15 molar percent of a lithium salt in a solvent.

13 Claims, 2 Drawing Sheets

(56) References Cited

U.S. PATENT DOCUMENTS

| | | | |
|---|---|---|---|
| 2008/0248375 A1* | 10/2008 | Cintra | H01M 4/131 |
| | | | 429/94 |
| 2012/0021296 A1 | 1/2012 | Funada et al. | |
| 2013/0089795 A1* | 4/2013 | Chase | H01M 4/8605 |
| | | | 429/405 |
| 2015/0155555 A1 | 6/2015 | Yamamoto et al. | |
| 2015/0188187 A1 | 7/2015 | Strand et al. | |
| 2016/0064773 A1 | 3/2016 | Choi et al. | |
| 2016/0087306 A1 | 3/2016 | Lee et al. | |

OTHER PUBLICATIONS

International Search Report & Written Opinion dated Jul. 11, 2017 in International application No. PCT/US2017/024758.

\* cited by examiner

HIGH VOLTAGE SOLID ELECTROLYTE COMPOSITIONS

BACKGROUND OF THE INVENTION

The present invention is in the field of battery technology and, more particularly, in the area of solid polymeric materials and composites for use in electrodes and electrolytes in electrochemical cells.

Conventional lithium ion batteries include a positive electrode (or cathode as used herein), a negative electrode (or anode as used herein), an electrolyte, and, frequently, a separator. The electrolyte typically includes a liquid component that facilitates lithium ion transport and, in particular, enables ion penetration into the electrode materials.

In contrast, so-called solid-state lithium ion batteries do not include liquid in their principal battery components. Solid-state batteries can have certain advantages over liquid electrolyte batteries, such as improvements in safety because liquid electrolytes often contain volatile organic solvents. Solid-state batteries offer a wider range of packaging configurations because a liquid-tight seal is not necessary as it is with liquid electrolytes.

Generally, batteries having a solid-state electrolyte can have various advantages over batteries that contain liquid electrolyte. For small cells, such as those used in medical devices, the primary advantage is overall volumetric energy density. Figure For example, small electrochemical cells often use specific packaging to contain the liquid electrolyte. For a typical packaging thickness of 0.5 mm, only about 60% of the volume can be used for the battery with the remainder being the volume of the packaging. As the cell dimensions get smaller, the problem becomes worse.

Elimination of the liquid electrolyte facilitates alternative, smaller packaging solutions for the battery. Thus, a substantial increase in the interior/exterior volume can be achieved, resulting in a larger total amount of stored energy in the same amount of space. Therefore, an all solid-state battery is desirable for medical applications requiring small batteries. The value is even greater for implantable, primary battery applications as the total energy stored often defines the device lifetime in the body.

Further, solid-state batteries can use lithium metal as the anode, thereby dramatically increasing the energy density of the battery as compared to the carbon-based anodes typically used in liquid electrolyte lithium ion batteries. With repeated cycling, lithium metal can form dendrites, which can penetrate a conventional porous separator and result in electrical shorting and runaway thermal reactions. This risk is mitigated through the use of a solid nonporous electrolyte.

The electrolyte material in a solid-state lithium ion battery can be a polymer. In particular, poly(ethylene oxide) ("PEO") can be used in forming solid polymer electrolytes. PEO has the ability to conduct lithium ions as positive lithium ions are solubilized and/or complexed by the ethylene oxide groups on the polymer chain. Solid electrolytes formed from PEO can have crystalline and amorphous regions, and it is believed that lithium ions move preferentially through the amorphous portion of the PEO material. In general, ionic conductivities on the order of $1 \times 10^{-6}$ S/cm to $1 \times 10^{-5}$ S/cm at room temperature can be obtained with variations on PEO based electrolyte formulations. The electrolyte is typically formulated by adding a lithium ion salt to the PEO in advance of building the battery, which is a formulation process similar to liquid electrolytes.

PEO has been widely studied as a component of solid electrolytes due to its comparatively high lithium ion conductivity. As one of the most extensively studied polymers, several reports combine PEO with lithium salts, plasticizers, and other fillers to make solid polymer electrolytes with comparatively high conductivity. One of the challenges for the implementation of PEO into lithium ion batteries is the instability of PEO at voltages higher than 4.2V. PEO will begin to degrade at these higher voltages, leading to a significant decrease in battery performance and ultimately limiting the number of cycles before cell failure.

However, solid-state batteries have not achieved widespread adoption because of practical limitations. For example, while polymeric solid-state electrolyte materials like PEO are capable of conducting lithium ions, their ionic conductivities are inadequate for practical power performance. Successful solid-state batteries require thin film structures, which reduce energy density, and thus have limited utility.

Depending on the specific components combined with the PEO into the membrane, the oxidation onset can be suppressed to higher voltages, thus improving the stability of PEO. Some literature has reported improved PEO stability based on specific components (see, e.g., M. Armand, *Solid State Ionics*, 9&10, 1983, 745). More generally, ionically conductive polymers like PEO have been disclosed with the use of a lithium salt as the source of lithium ions in the solid electrolyte. For example, Teran et al., *Solid State Ionics* (2011) 18-21; Sumathipala et al., *Ionics* (2007) 13: 281-286; Abouimrane et al., *JECS* 154(11) A1031-A1034 (2007); Wang et al., *JECS*, 149(8) A967-A972 (2002); and Egashira et al., *Electrochimica Acta* 52 (2006) 1082-1086 each disclose different solid electrolyte formulations with PEO and a lithium salt as the source for lithium ions. Still further the last two references (Wang et al. and Egashira et al.) each disclose inorganic nanoparticles that are believed to improve the ionic conductivity of the PEO film by preventing/disrupting polymer crystallinity. However, none of these formulations address all the limitations of solid electrolytes and provide the performance improvements seen in the embodiments disclosed below.

BRIEF SUMMARY OF THE INVENTION

Embodiments of the present invention provide improved high voltage stability for batteries including a PEO-based solid electrolyte.

Certain embodiments include a lithium ion battery having an anode, a cathode comprising an electrode active material, and a solid electrolyte. The solid electrolyte includes a polymer gel, which in turn includes a combination of an ethylene oxide polymer portion and a liquid precursor portion. The liquid precursor portion includes a solvent and at least 20 molar percent of a lithium salt. The solid electrolyte is electrochemically stable at voltages greater than about 5.5 V as compared to a comparable solid electrolyte with a liquid precursor portion having less than 20 molar percent of a lithium salt.

In some embodiments, the liquid precursor portion includes butylene carbonate. In some embodiments, the liquid precursor portion includes butyl sulfoxide. In some embodiments, the liquid precursor portion includes n-methyl-2-pyrrolidone. In some embodiments, the liquid precursor portion includes lithium bis(trifluoromethanesulfonyl)imide. In some embodiments, the liquid precursor portion includes butylene carbonate. In some embodiments, the liquid precursor portion includes lithium tetrafluoroborate. In some embodiments, the liquid precursor portion includes lithium tetrafluoroborate.

In some embodiments, the polymer is a ethylene oxide polymer is represented by:

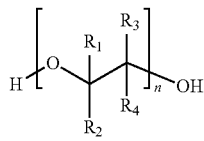

where $R_1$, $R_2$, $R_3$, and $R_4$ are each independently selected from the group consisting of hydrogen, substituted and unsubstituted hydride groups, substituted and unsubstituted hydroxy groups, substituted and unsubstituted alkyl groups, substituted and unsubstituted alkenyl groups, substituted and unsubstituted alkynyl groups, substituted and unsubstituted aryl groups, substituted and unsubstituted iminyl groups, substituted and unsubstituted alkoxy groups, substituted and unsubstituted alkenoxy groups, substituted and unsubstituted alkynoxy groups, substituted and unsubstituted aryloxy groups, substituted and unsubstituted vinyl groups, substituted and unsubstituted acrylic groups, and substituted and unsubstituted acryloyl groups.

DETAILED DESCRIPTION OF THE INVENTION

Figure 1A:
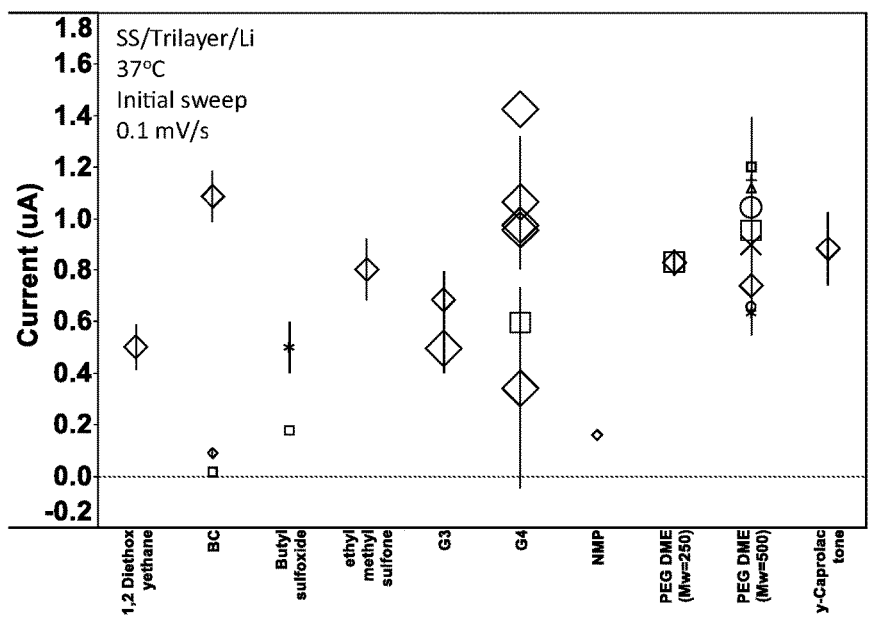
FIG. 1A illustrates the results of electrochemical testing of solid electrolyte formulations according to certain embodiments of the invention.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A "C-rate" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

The term "solid electrolyte" as used herein is used primarily to distinguish from electrolyte formulations where the formulation is an entirely liquid phase, almost entirely liquid phase, or substantially liquid phase.

Ranges presented herein are inclusive of their endpoints. Thus, for example, the range 1 to 3 includes the values 1 and 3 as well as intermediate values.

Solid-state batteries can be formed using polymeric materials with ion conducting properties. The polymeric materials can be used in the solid electrolyte formulation that is used to conduct ions from one electrode to another. The polymeric material should have suitable mechanical properties and thermal stability, in addition to the desired level of ionic conductivity, and specifically lithium ion conductivity.

As with other applications using polymeric materials, the properties of the solid structure of the polymeric material can be influenced by (i) the choice of polymer, (ii) the molecular weight of the polymer, (iii) the polydispersity of the polymer, (iv) the processing conditions, and (v) the presence of additives. While combinations of these factors are generally known, it is not necessarily predictable how these various factors will interact in a given application. Certain polymeric materials have shown utility for use in a solid electrolyte formulations based on the combination of factors listed above.

Poly(ethylene oxide) ("PEO") is a suitable polymeric material for use in lithium ion solid-state batteries. PEO is a commodity polymer available in a variety of molecular weights. PEO can range from very short oligomers of about 300 g/mol (or 300 Da) to very high molecular weights of 10,000,000 g/mol (or 10,000 kDa). At molecular weights of 20 kDa and below, PEO is typically referred to as poly (ethylene glycol) or PEG. PEO has been used as a separator in conventional liquid electrolyte systems and, as described above, as a component in a thin film solid electrolyte. The use of PEO as a separator in conventional liquid electrolyte systems is technically distinct from the use described herein, and such use in separators is not predictive of the results achieved by certain of the embodiments disclosed herein.

PEO processed into any structure, whether intended for a solid-state battery or not, can have both crystalline and amorphous domains. Ionic conductivity happens more readily in the amorphous domains and, therefore, processing conditions that decrease crystalline domain size and/or the overall amount of crystallinity are preferred for uses of PEO that include solid electrolyte formulations. Some research has used carbonate solvents, such as ethylene carbonate, dimethyl carbonate, or diethyl carbonate, as plasticizers to improve ionic transport and reduce interfacial impedance. However, this involves the addition of a volatile, flammable solvent to the battery and negates much of the safety benefits brought by a solid-state electrolyte. In PEO systems, PEG can be added to achieve the desired processing properties, such as a preferred solution viscosity, film modulus, or film glass transition temperature.

While PEO is discussed herein as a preferred polymeric material, it is understood that other polymers with equivalent chemical, electrochemical, mechanical, and/or thermal properties can be used in place of or in addition to PEO and/or PEO/PEG mixtures. Further, copolymers that include PEO, PEG, or PEO-like polymers in at least one segment of the copolymer can be suitable for certain embodiments described herein. Thus, the embodiments described herein that refer to PEO or PEO/PEG are understood to encompass other such polymeric and co-polymeric materials. Further, the embodiments described herein that refer to PEO or PEO/PEG are understood to encompass routine chemical modifications to the chemical structure of the PEO or PEO/PEG, where such routine chemical modifications do not substantially alter the structure, conductivity, and/or utility of the PEO or PEO/PEG.

PEO and PEG can be represented as structure (a):

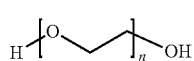

(a)

where n indicates the number of repeat units in the polymer chain. PEO and PEG can be referred to as an "ethylene oxide" polymer. And, the variations of PEO and PEG can be represented as structure (b):

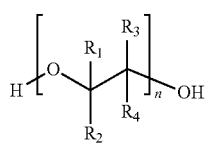

(b)

where $R_1$, $R_2$, $R_3$, and $R_4$ represent examples of the site of substitution that may be considered within the scope of the embodiments disclosed herein. Routine substitutions of groups including, but not limited to, hydride groups, hydroxy groups, alkyl groups, alkenyl groups, alkynyl groups, aryl groups, iminyl groups, alkoxy groups, alkenoxy groups, alkynoxy groups, and aryloxy groups, each of which can contain further substitutions. Thus, "ethylene" oxide polymers embrace PEO, PEO/PEG, and the various modifications contemplated herein.

According to certain embodiments discussed herein, the high voltage stability of a solid electrolyte including PEO as the ion conducting material was improved. That is, certain solid electrolyte formulations including PEO, a lithium salt, and a non-volatile liquid component or components resulted in a higher voltage stability of the material. Recalling that one of the challenges for the implementation of PEO into lithium ion batteries is the instability of PEO at voltages higher than 4.2V, the embodiments demonstrating high voltage stability are an unexpected improvement over past uses of PEO. Certain PEO formulations disclosed herein mitigate the expected degradation of the solid electrolyte at higher voltages, leading to an improved battery performance and cycle life.

The preferred salt and solvent formulations were identified using a series of analytical methods, beginning with selection of salts and solvents having desirable properties. For solvents, the following properties are desirable: (1) high boiling point and/or high molecular weight, which typically correlate with comparatively low volatility; (2) comparatively high dielectric constant; (3) comparatively high salt solubility; and (4) chemical stability on lithium metal. For salts, the following properties are desirable: (1) a comparatively high degree of dissociation, which is typically correlated with comparatively high solubility of the salt; (2) a comparatively bulky anion☐, which is typically correlated with a comparatively high lithium ion transference number; and (3) stability on lithium metal.

Certain solvent families have constituent members that exhibit one or more of the solvent properties listed above. For example, carbonates, such as diethyl carbonate, dipropyl carbonate, diisopropyl carbonate; cyclic carbonates, such as ethylene carbonate, propylene carbonate, butylene carbonate, fluoroethylene carbonate; amides such as dimethyl acetamide, N-methyl acetamide, N-methyl-2-pyrrolidone; nitriles, such as methoxyl propionitrile, adiponitrile, glutaronotrile, succinonitrile, benzonitrile; sulfites, such as diethylsulfite, propylene glycol sulfite; sulfones, such as sulfolane, ethyle methyl sulfone, diethyl sulfone, dimethyl sulfone; sulfoxides, such as butyl sulfoxide; esters, such as propyl butyrate, dimethyl malonate, butyl propionate, pentyl acetate; lactones, such as γ-valerolactone, γ-butyrolactone; glyme ethers, such as diglyme, trugylme, tertraglyme, 1,2-diethoxyethane, hexaglyme; cyclic ethers, such as 1,4-dioxane; crown ethers, such as 18-crown-6 ether.

The lithium salts used to create the improved solid electrolytes disclosed herein include, but are not limited to, lithium bis(trifluoromethanesulfonyl)imide ($CF_3SO_2NLiSO_2CF_3$) (also referred to herein as "LiTFSI"), lithium tetrafluoroborate ($LiBF_4$), lithium hexafluoroarsenate ($LiAsF_6$), lithium bis(oxalato)borate ($LiB(C_2O_4)_2$) (also referred to herein as "LiBOB"), lithium chlorate ($LiClO_4$), lithium hexafluorophosphate ($LiPF_6$), and lithium triflate ($LiCF_3SO_3$). Preferably, lithium bis(trifluoromethanesulfonyl)imide and lithium tetrafluoroborate are used in the solid electrolyte formulations.

The liquid components used to create the improved solid electrolytes disclosed herein include, but are not limited to, butylene carbonate (represented as structure (c)):

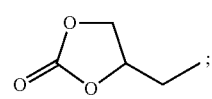

(c)

butyl sulfoxide (represented as structure (d)):

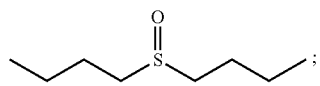

(d)

and n-methyl-2-pyrrolidone (NMP) (represented as structure (e)):

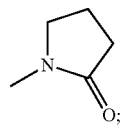

(e)

1,2 diethoxy ethane (represented as structure (f)):

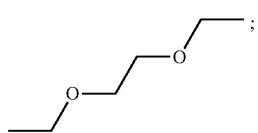

(f)

ethyl methyl sulfone (represented as structure (g)):

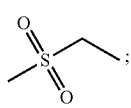

triethylene glycol dimethyl ether (represented as structure (h)):

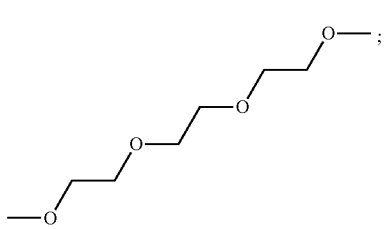

dimethyltetraglycol (represented as structure (i)):

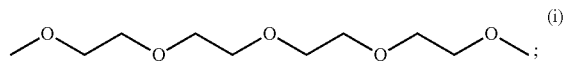

poly(ethylene glycol) dimethyl ether (number average molecular weight about 250, and number average molecular weight about 500) (each represented as structure (j)):

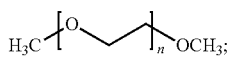

and
γ-caprolactone (represented as structure (k)):

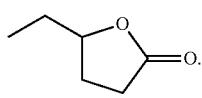

The liquid components disclosed herein are understood to encompass routine chemical modifications to their chemical structure, where such routine chemical modifications do not substantially alter the structure, conductivity, and/or utility of the liquid component.

The volatility of salt/solvent compositions was calculated gravimetrically by weighing vessels with solvents, lithium salt/solvent complexes, or formulations before and after exposure to elevated temperature of 160 degrees Celsius under vacuum (└30 in Hg) for 4 hours. For salts with decomposition temperature less than 180 degrees Celsius, 37 degrees Celsius was used for evaluation instead of 160 degrees Celsius. The electrolyte exposed surface area to volume ratio was kept constant. All materials were prepared under argon prior to volatility testing to avoid moisture pickup prior to the measurement. The gravimetric method was able to distinguish differences in weight loss, and thus volatility, for varying formulations with good reproducibility.

Salt/solvent compositions were evaluated for volatility and ionic conductivity, followed by tests of the pulse power test in a cell. Volatility screening on flowing salt/solvent compositions was done using versus a control. Some salt/solvent compositions did not flow and were eliminated from the testing. For volatility, a 20% normalized weight loss or less is desirable. In general, LiTFSI showed lowest volatility compared to all other salts in many of the tested solvents. Combinations with PEG DME (Mw=500), methoxy propionitrile, and butyl sulfoxide also had low volatility with certain salts other than LiTFSI. In sum, salt choice has strong effect on volatility.

Ionic conductivities of the salt/solvent combinations were also tested according to the method described below. An ionic conductivity of at least 0.1 mS/cm is desirable. In general, the ionic conductivities of 20 molar % salt formulation were greater than those of 40 molar % salt. However, there was no strong dependency on the type of salt. Most formulations had adequate conductivity, which does not appear to be a limiting performance factor.

Data for all the key metrics for the screened formulations were acquired and analyzed. Most cells showed an expected open circuit voltage of at least 3V. However, the ability to discharge was solvent dependent, with solvents in the same family often showing similar performance. Glyme ethers and lactones worked well, while carbonates and nitriles generally performed poorly. For the solvents that are able to discharge well, most salts could yield good discharge capacity. For good performing solvents, most salts can give good discharge capacity. Interestingly, there was not a good correlation between ionic conductivity and the ability to discharge, indicating there may be high interfacial impedance or incomplete wetting on the lithium surface. Cells with high capacity can also show higher average voltage for some formulations illustrating a reduced underpotential. The solvent family has a strong impact on the power performance of the cells. Like capacity, power did not correlate with conductivity.

The preferable salt/solvent compositions were combined with polymer. Among the most preferable combinations of polymer, lithium salt, and liquid component for use as a high voltage solid electrolyte formulation are the following: poly(ethylene oxide)/lithium tetrafluoroborate/butylene carbonate; poly(ethylene oxide)/lithium bis(trifluoromethanesulfonyl)imide/butylene carbonate; poly(ethylene oxide)/lithium tetrafluoroborate/butyl sulfoxide; and poly(ethylene oxide)/lithium bis(trifluoromethanesulfonyl)imide/n-methyl-2-pyrrolidone. Each of these formulations significantly improved high voltage stability of a solid-state battery including a solid electrolyte of these formulations.

The preferred poly(ethylene oxide) polymer can have a weight average molecular weight ($M_w$) in the range of about 300 Daltons to about 10,000,000 Daltons (10M Da). Although the molecular weight of the poly(ethylene oxide) may not have a critical value for the property of voltage stability, the molecular weight of the poly(ethylene oxide) is more important for other properties, such as the mechanical stability of the films. The typical $M_w$ value for the PEO used in examples and embodiments disclosed herein is 5,000,000 Daltons (5M Da). Other values may be suitable.

The polymer is incorporated in the solid electrolyte formulation in a weight percent (of the total weight of the formulation) of at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95%. More preferably, the polymer is incorporated in the solid electrolyte formulation at a weight percent of at least 60%, at least 61%, at least 62%, at least 63%, at least 64%, at least 65%, at least 66%, at least 67%, at least 68%, or at least 69%. Still more preferably, the polymer is incorporated in the solid electrolyte formulation at a weight percent of between about 63% and about 64%.

The lithium salt and the liquid component are combined to form a liquid precursor portion of the electrolyte formulation. The liquid precursor portion includes an amount of salt that is at least 5 molar %, at least 10 molar %, at least 15 molar %, at least 20 molar %, at least 25 molar %, at least 30 molar %, at least 35 molar %, at least 40 molar %, at least 45 molar %, or at least 50 molar %, where the molar % is the molar fraction of the salt in the liquid precursor portion of the formulation and does not include the polymer portion of the formulation. More preferably, the amount of salt in the liquid precursor portion includes from about 15 molar % to about 25 molar %. In some embodiments, about 20 molar % of salt in the liquid precursor portion is preferred.

Among the various combination of salt and liquid component disclosed above, several were included in solid electrolyte formulations that demonstrated substantial improvements over conventional solid electrolyte formulations and over similar formulations at different molar ratios. For example, 20 molar % lithium tetrafluoroborate in butylene carbonate improves high voltage stability of a solid-state battery significantly, while 40 molar % lithium tetrafluoroborate in butylene carbonate does not. These two exemplary liquid precursor portions were each mixed with the same amount of the same polymer. Thus, the difference in high voltage stability is due to the specific properties generated by the combination of 20 molar % lithium tetrafluoroborate in butylene carbonate in poly(ethylene oxide) as identified in more detail below. Thus, several of the embodiments disclosed herein have a critical composition window in which the formulation substantially improves solid-state battery performance, but does not improve performance when the formulation components are not within the composition window. This result is unexpected and not predicted by any prior use of the components in isolation or in combination.

Further, the composition windows disclosed herein are in some cases specific to the formulation components. For example, the liquid precursor portion formed from a butyl sulfoxide liquid component and a lithium salt demonstrates different performance in a solid electrolyte depending on the identity of the lithium salt even when those lithium salts are included in the liquid precursor portion at the same concentration. Specifically, an electrolyte formulation including 20 molar % of lithium tetrafluoroborate in butyl sulfoxide demonstrates substantial high voltage stability improvements as compared to an electrolyte formulation including 20 molar % of lithium hexafluorophosphate when all other aspects of the electrolyte formulation are the same.

The solid-state batteries formed using the solid electrolyte formulations disclosed herein can be used with electrode configurations and materials known for use in solid-state batteries. The active material for use in the cathode can be any active material or materials useful in a lithium ion battery cathode, including the active materials in lithium metal oxides or layered oxides (e.g., Li(NiMnCo)O$_2$), lithium rich layered oxide compounds, lithium metal oxide spinel materials (e.g., LiMn$_2$O$_4$, LiNi$_{0.5}$Mn$_{1.5}$O$_4$), olivines (e.g., LiFePO$_4$, etc.). Preferred cathode active materials include lithium cobalt oxide (e.g., (LiCoO$_2$) and lithium titanium oxide (e.g., Li$_4$Ti$_5$O$_{12}$, Li$_2$TiO$_3$). Active materials can also include compounds such as silver vanadium oxide (SVO), metal fluorides (e.g., CuF$_2$, FeF$_3$), and carbon fluoride (CF$_x$). The finished cathode can include a binder material, such as poly(tetrafluoroethylene) (PTFE). More generally, the active materials for cathodes can include phosphates, fluorophosphates, fluorosulfates, silicates, spinels, and composite layered oxides. The materials for use in the anode can be any material or materials useful in a lithium ion battery anode, including lithium-based, silicon-based, and carbon-based anodes.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

EXAMPLES

Preparation of Solid Electrolyte Films.

Electrolytes were fabricated using a multi-step process. A lithium salt was suspended in the liquid solvent component at the desired mole percentage via mechanical shaking of the salt/solvent mixture for a period of at least six hours, but typically overnight, under an argon atmosphere. The salt/solvent suspension was then combined, via low energy mechanical milling in air, with the desired weight percentage of PEO. When a stable gel was formed, the resulting gel was annealed under vacuum for about 48 hours at about 87 degrees Celsius. Following annealing, the gel was calendared to a desired thickness. The self-supported electrolyte was layered on both sides of a celgard separator and then punched to the appropriate size for electrochemical testing.

Cell Assembly.

Test cells were formed in a high purity argon filled glove box (M-Braun, O$_2$ and humidity content<0.1 ppm). The two electrodes were Li metal foil and stainless steel respectively. The electrolyte layers and separator were placed between a lithium metal foil electrode and a stainless steel electrode to assemble the cell stack. After assembly, the cell stack was annealed at 70 degrees Celsius for about 2 hours with stack pressure maintained at a fixed amount. The cell was sealed and characterized by cyclic voltammetry. Sweep rates were typically 0.1 mV/s to various voltages in each cycle.

Cyclic Voltammetry Characterization.

A four cycle protocol was used for cyclic voltammetry as follows: Cycle 0, set voltage to 3 V; Cycle 1, sweep up to 5V and then sweep down to 1V; Cycle 2, sweep up to 5V and then sweep down to 1V; Cycle 3, sweep up to 6V and then sweep down to 1V; Cycle 4, sweep up to 6V and then sweep down to 1V.

Characterization Results at 4.4 V and 5.0 V.

Figure 1B:
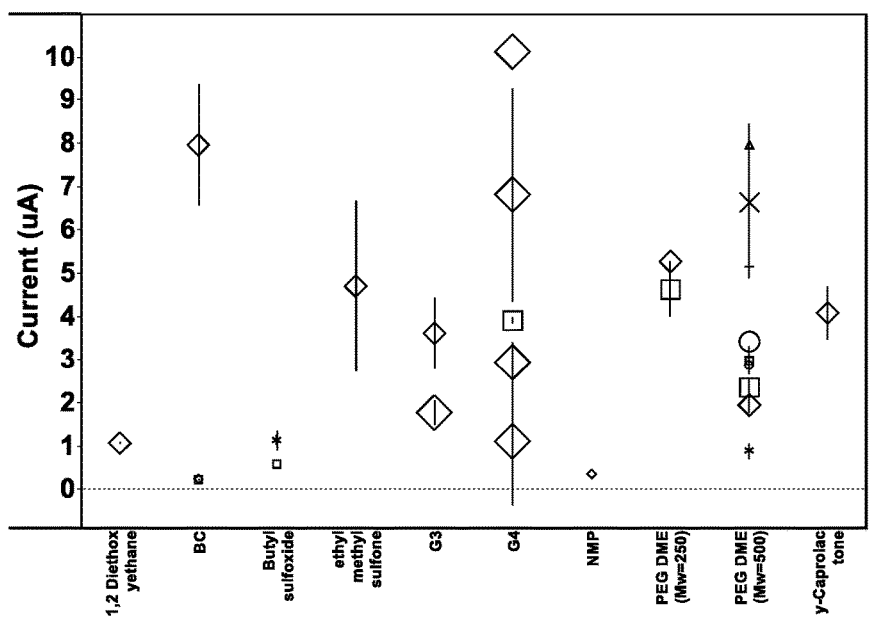
FIG. 1B illustrates the results of electrochemical testing of solid electrolyte formulations according to certain embodiments of the invention.

FIGS. 1A and 1B illustrate the results of electrochemical testing of solid electrolyte formulations according to certain embodiments of the invention. In these examples, several solid electrolyte formulations were made according to the method disclosed above. In each case, the polymer composition was the preferred PEO, with an average "n" of 5000. The solid electrolyte was formulated with approximately 63 weight % PEO, with the remainder composed of the lithium salt and liquid component (which together form the liquid precursor portion). In such formulations, the lithium salt content is at least 6 weight % of the total weight of the formulation. This weight % is determined by recognizing that if the polymer constitutes approximately 63 weight %, the liquid precursor portion is approximately 37 weight %. At a 20M concentration of lithium salt in the liquid precursor portion, the lithium salt is around 17 weight % of the precursor portion (varying with the exact choice of salt and solvent). Thus, 17% of 37% yields approximately 6% overall. At a 40M concentration of lithium salt, the overall weight % of salt would of course be higher, and the overall weight % of salt would be higher as the amount of solvent in the solid electrolyte decreases. In FIGS. 1A and 1B, "SS" refers to the stainless steel electrode, "trilayer" refers to assembly of the solid electrolyte on either side of a separator as described above, and "Li" refers to the lithium electrode.

FIGS. 1A and 1B illustrate the results of lithium hexafluoroarsenate (LiAsF$_6$), lithium tetrafluoroborate (LiBF$_4$), lithium bis(oxalato)borate (LiBOB), lithium chlorate (LiClO$_4$), lithium hexafluorophosphate (LiPF$_6$), lithium bis(trifluoromethanesulfonyl)imide (LiTFSI), and lithium triflate (LiCF$_3$SO$_3$) combined with 1,2 diethoxy ethane, butylene carbonate, butyl sulfoxide, ethyl methyl sulfone, triethylene glycol dimethyl ether, dimethyltetraglycol, n-methyl-2-pyrrolidone, poly(ethylene glycol) dimethyl ether (both Mw$_n$=200 and Mw$_n$=500), and γ-caprolactone. In these examples, the molar % of the salts was set at 20 molar %, 40 molar %, or 50 molar percent. FIGS. 1A and 1B provide the identities of the specific combinations and performance.

FIGS. 1A and 1B illustrate fairly consistent results for the improved solid electrolyte formulations as compared to electrolyte formulations. For example, at 4.4 V a formulation including about 63 weight % PEO and a 20 molar % lithium tetrafluoroborate in butylene carbonate demonstrated very low current, as did a formulation including about 63 weight % PEO and a 20 molar % lithium bis(trifluoromethanesulfonyl)imide in butylene carbonate. Similarly, at 4.4 V a formulation including about 63 weight % PEO and a 20 molar % lithium tetrafluoroborate in butyl sulfoxide demonstrated comparatively low current. And, at 4.4 V a formulation including about 63 weight % PEO and a 20 molar % lithium bis(trifluoromethanesulfonyl)imide in n-methyl-2-pyrrolidone demonstrated comparatively low current.

FIG. 1B illustrates that each of the formulations that provided substantial comparative improvements at 4.4 V also provide substantial improvements at 5.0 V. It is important to note the performance of other formulations that did not show substantial improvement as this illustrates the challenge of high voltage stability and the uniqueness of the formulations that provide this high voltage stability. The γ-axis in FIG. 1A is a fraction of the γ-axis in FIG. 1B. That is, even comparatively poor performing electrolyte formulations demonstrate low current (less than about 1.2 μA) at 4.4 V. However, at 5.0 V the comparatively poor performing electrolyte formulations demonstrate current as high as about 10 μA. This comparison between formulations at 4.4 V and 5.0 V shows the substantial stability imparted by certain embodiments of a solid electrolyte formulation disclosed herein.

Figure 2:
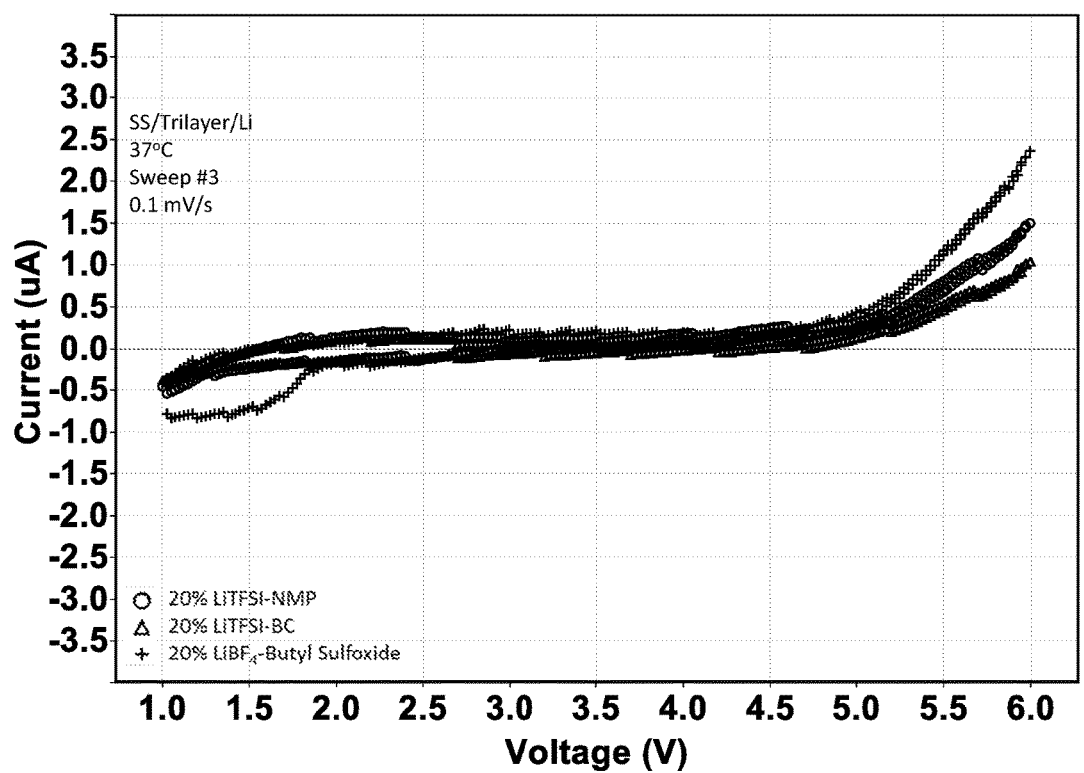
FIG. 2 illustrates the results of electrochemical testing of solid electrolyte formulations according to certain embodiments of the invention.

FIG. 2 illustrates the results of electrochemical testing of solid electrolyte formulations according to certain embodiments of the invention. FIG. 2 provides further evidence of the improved stability of certain solid electrolyte formulations. In FIG. 2, "SS" refers to the stainless steel electrode, "trilayer" refers to assembly of the solid electrolyte on either side of a separator as described above, and "Li" refers to the lithium electrode.

FIG. 2 demonstrates that three electrolyte formulations demonstrate high voltage stability to voltages greater than about 5.5 V. The cyclic voltammetry shows a generally flat curve lacking sharp increases in current. Since a sharp increase in current correlates to instability, FIG. 2 demonstrates substantial improvement in high voltage stability for certain solid electrolyte formulations, including a formulation including about 63 weight % PEO and a 20 molar % lithium bis(trifluoromethanesulfonyl)imide in butylene carbonate, a formulation including about 63 weight % PEO and a 20 molar % lithium bis(trifluoromethanesulfonyl)imide in n-methyl-2-pyrrolidone, and a formulation including about 63 weight % PEO and a 20 molar % lithium tetrafluoroborate in butyl sulfoxide.

In the embodiments disclosed herein, substantial improvements in high voltage stability of solid electrolytes enables the use of a PEO-based solid electrolyte in high energy battery cells. Such high energy battery cells can include cathodes formed from high energy active materials, including but not limited to, lithium-manganese-nickel oxides (LMNO), lithium-manganese-nickel-cobalt oxides (NMC), lithium-cobalt-phosphates, and lithium-cobalt-oxides.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

We claim:

1. An electrochemical cell, comprising:
   an anode;
   a cathode comprising an electrode active material; and
   a gel electrolyte film layer comprising: (i) a polymer gel, wherein the polymer gel comprises an ethylene oxide polymer portion; (ii) a liquid portion, wherein the liquid portion comprises a solvent; and (iii) at least 6 weight percent of a lithium salt;
   wherein the electrolyte is electrochemically stable at voltages greater than about 4.4 V.

2. The electrochemical cell of claim 1, wherein the liquid portion comprises butylene carbonate.

3. The electrochemical cell of claim 1, wherein the liquid portion comprises butyl sulfoxide.

4. The electrochemical cell of claim 1, wherein the liquid portion comprises n-methyl-2-pyrrolidone.

5. The electrochemical cell of claim 2, wherein the lithium salt comprises lithium bis(trifluoromethanesulfonyl)imide.

6. The electrochemical cell of claim 1, wherein the liquid portion comprises butylene carbonate and the lithium salt is lithium bis(trifluoromethanesulfonyl)imide.

7. The electrochemical cell of claim 4, wherein the lithium salt comprises lithium bis(trifluoromethanesulfonyl)imide.

8. The electrochemical cell of claim 1, wherein the liquid portion comprises n-methyl-2-pyrrolidone and the lithium salt is lithium bis(trifluoromethanesulfonyl)imide.

9. The electrochemical cell of claim 2, wherein the lithium salt comprises lithium tetrafluoroborate.

10. The electrochemical cell of claim 1, wherein the liquid portion comprises butylene carbonate and the lithium salt is lithium tetrafluoroborate.

11. The electrochemical cell of claim 3, wherein the lithium salt comprises lithium tetrafluoroborate.

12. The electrochemical cell of claim 1, wherein the liquid portion comprises butyl sulfoxide and the lithium salt is lithium tetrafluoroborate.

13. The electrochemical cell of claim 1, wherein the ethylene oxide polymer is represented by:

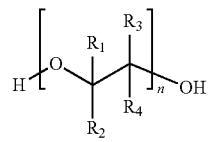

where n≥1, $R_1$, $R_2$, $R_3$, and $R_4$ are each independently selected from the group consisting of hydrogen, substituted and unsubstituted hydride groups, substituted and unsubstituted hydroxy groups, substituted and unsubstituted alkyl groups, substituted and unsubstituted alkenyl groups, substituted and unsubstituted alkynyl groups, substituted and unsubstituted aryl groups, substituted and unsubstituted iminyl groups, substituted and unsubstituted alkoxy groups, substituted and unsubstituted alkenoxy groups, substituted and unsubstituted alkynoxy groups, substituted and unsubstituted aryloxy groups, substituted and unsubstituted vinyl groups, substituted and unsubstituted acrylic groups, and substituted and unsubstituted acryloyl groups.

* * * * *